(12) United States Patent
Lin et al.

(10) Patent No.: US 11,064,188 B2
(45) Date of Patent: Jul. 13, 2021

(54) DRIVING METHOD FOR CALCULATING INTERPUPILLARY DISTANCE AND RELATED HEAD-MOUNTED DEVICE

(71) Applicant: HTC Corporation, Taoyuan (TW)

(72) Inventors: Yung-Chen Lin, Taoyuan (TW);
Wen-Ju Chen, Taoyuan (TW);
Wei-Chen Chen, Taoyuan (TW);
Kai-Wen Zheng, Taoyuan (TW);
Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/914,494

(22) Filed: Jun. 29, 2020

(65) Prior Publication Data

US 2021/0037232 A1 Feb. 4, 2021

Related U.S. Application Data

(60) Provisional application No. 62/879,545, filed on Jul. 29, 2019, provisional application No. 62/879,548, filed on Jul. 29, 2019.

(51) Int. Cl.
| | |
|---|---|
| *H04N 13/344* | (2018.01) |
| *H04N 13/239* | (2018.01) |
| *H04N 13/383* | (2018.01) |
| *H04N 13/398* | (2018.01) |
| *H04N 13/00* | (2018.01) |
| *G02B 27/01* | (2006.01) |

(52) U.S. Cl.
CPC ....... *H04N 13/344* (2018.05); *G02B 27/0176* (2013.01); *H04N 13/239* (2018.05); *H04N 13/383* (2018.05); *H04N 13/398* (2018.05); *H04N 2013/0081* (2013.01)

(58) Field of Classification Search
CPC ........ G02B 2027/0138; G02B 27/0172; G02B 27/0176; G02B 2027/0134; H04N 13/344; H04N 13/383; H04N 13/398; H04N 13/239; H04N 2013/0081
See application file for complete search history.

(56) References Cited

U.S. PATENT DOCUMENTS

| | | | |
|---|---|---|---|
| 10,288,885 B2 | 5/2019 | Makino | |
| 10,701,350 B1 * | 6/2020 | Ebert | ...................... A61B 3/111 |

(Continued)

FOREIGN PATENT DOCUMENTS

| | | | |
|---|---|---|---|
| CN | 106802482 A | | 6/2017 |
| JP | 08106547 A | * | 4/1996 |

(Continued)

*Primary Examiner* — David E Harvey
(74) *Attorney, Agent, or Firm* — CKC & Partners Co., LLC (57) ABSTRACT

A driving method suitable for a head mounted device (HMD) is provided. The driving method includes the following operations: moving a first image capture unit and a second image capture unit of the HMD to respectively capture two left-eye images and two right-eye images; calculating a first eye relief according to at least one left-eye feature in the two left-eye images; calculating a second eye relief according to at least one right-eye feature in the two right-eye images; calculating an interpupillary distance (IPD) according to the first eye relief and the second eye relief; and adjusting, according to the IPD, a distance between a first lens and a second lens of the HMD.

20 Claims, 11 Drawing Sheets

(56) References Cited

U.S. PATENT DOCUMENTS

| | | | |
|---|---|---|---|
| 2006/0077558 A1* | 4/2006 | Urakawa | G02B 27/0093 |
| | | | 359/630 |
| 2016/0091720 A1* | 3/2016 | Stafford | G02B 27/0068 |
| | | | 345/8 |
| 2017/0010471 A1* | 1/2017 | Serrano Canovas | G02B 30/34 |
| 2017/0102549 A1* | 4/2017 | Lee | G02B 27/0172 |
| 2017/0184847 A1* | 6/2017 | Petrov | H04N 5/2256 |
| 2018/0140186 A1* | 5/2018 | Limon | G06K 9/46 |
| 2019/0041643 A1* | 2/2019 | Chang | H04N 13/344 |
| 2019/0079301 A1* | 3/2019 | Sauers | G02B 27/0176 |
| 2019/0204913 A1* | 7/2019 | Sarkar | G06F 3/013 |
| 2019/0222830 A1* | 7/2019 | Edwin | G06F 3/0346 |
| 2019/0377191 A1* | 12/2019 | Hughes | G06K 9/00617 |
| 2020/0064635 A1* | 2/2020 | Franklin | H04N 13/383 |
| 2020/0069178 A1* | 3/2020 | Goldberg | H04N 13/383 |
| 2020/0133003 A1* | 4/2020 | Wang | G02B 27/0172 |
| 2020/0186787 A1* | 6/2020 | Cantero Clares | H04N 13/106 |
| 2020/0211512 A1* | 7/2020 | Sztuk | G02B 27/0172 |
| 2020/0233453 A1* | 7/2020 | Hatfield | G06F 1/163 |
| 2020/0267380 A1* | 8/2020 | Liu | G02B 27/017 |
| 2020/0341283 A1* | 10/2020 | McCracken | G02B 27/0176 |
| 2021/0019493 A1* | 1/2021 | Yokoyama | G06T 7/70 |
| 2021/0022599 A1* | 1/2021 | Freeman | A61B 3/024 |

FOREIGN PATENT DOCUMENTS

| | | |
|---|---|---|
| TW | I646355 B | 1/2019 |
| WO | 2013027714 A1 | 2/2013 |

* cited by examiner

DRIVING METHOD FOR CALCULATING INTERPUPILLARY DISTANCE AND RELATED HEAD-MOUNTED DEVICE

CROSS-REFERENCE TO RELATED APPLICATION

This application claims priority to U.S. Provisional Application Ser. No. 62/879,545, filed Jul. 29, 2019, and U.S. Provisional Application Ser. No. 62/879,548, filed Jul. 29, 2019, all of which are herein incorporated by reference in their entireties.

BACKGROUND

Field of Invention

The present disclosure generally relates to a head-mounted device (HMD) driving method and related HMD. More particularly, the present disclosure relates to a HMD driving method and related HMD adaptively adjusts distance between lenses according to the user interpupillary distance.

Description of Related Art

Virtual reality is a technology of using a computer to simulate a three dimensional virtual world, providing the user with visual, auditory, tactile, and other sensory simulations. The head-mounted device (HMD) for virtual reality includes two lenses respectively corresponding to the left and right displays for providing stereoscopic virtual viewings. However, when the distance between the two lenses mismatches with the interpupillary distance (IPD) of the user, the user may observe image distortion which not only disrupts the user experience but also causes virtual reality sickness.

SUMMARY

The disclosure provides a driving method, suitable for a head mounted device (HMD), and includes the following operations: moving a first image capture unit and a second image capture unit of the HMD to respectively capture two left-eye images and two right-eye images; calculating a first eye relief according to at least one left-eye feature in the two left-eye images; calculating a second eye relief according to at least one right-eye feature in the two right-eye images; calculating an interpupillary distance (IPD) according to the first eye relief and the second eye relief; and adjusting, according to the IPD, a distance between a first lens and a second lens of the HMD.

The disclosure provides a HMD includes a first lens, a second lens, a first image capture unit disposed at a first housing with the first lens, a second image capture unit disposed at a second housing with the second lens, and a processing circuit. The processing circuit is adapted to: move the first image capture unit and the second image capture unit to respectively capture two left-eye images and two right-eye images; calculate, according to at least one left-eye feature in the two left-eye images, a first eye relief between the first image capture unit and a left pupil; calculate, according to at least one right-eye feature in the two right-eye images, a second eye relief between the second image capture unit and a right pupil; calculate an IPD according to the first eye relief and the second eye relief; and automatically adjust or prompt the user to manually adjust, according to the IPD, a distance between the first lens and the second lens.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
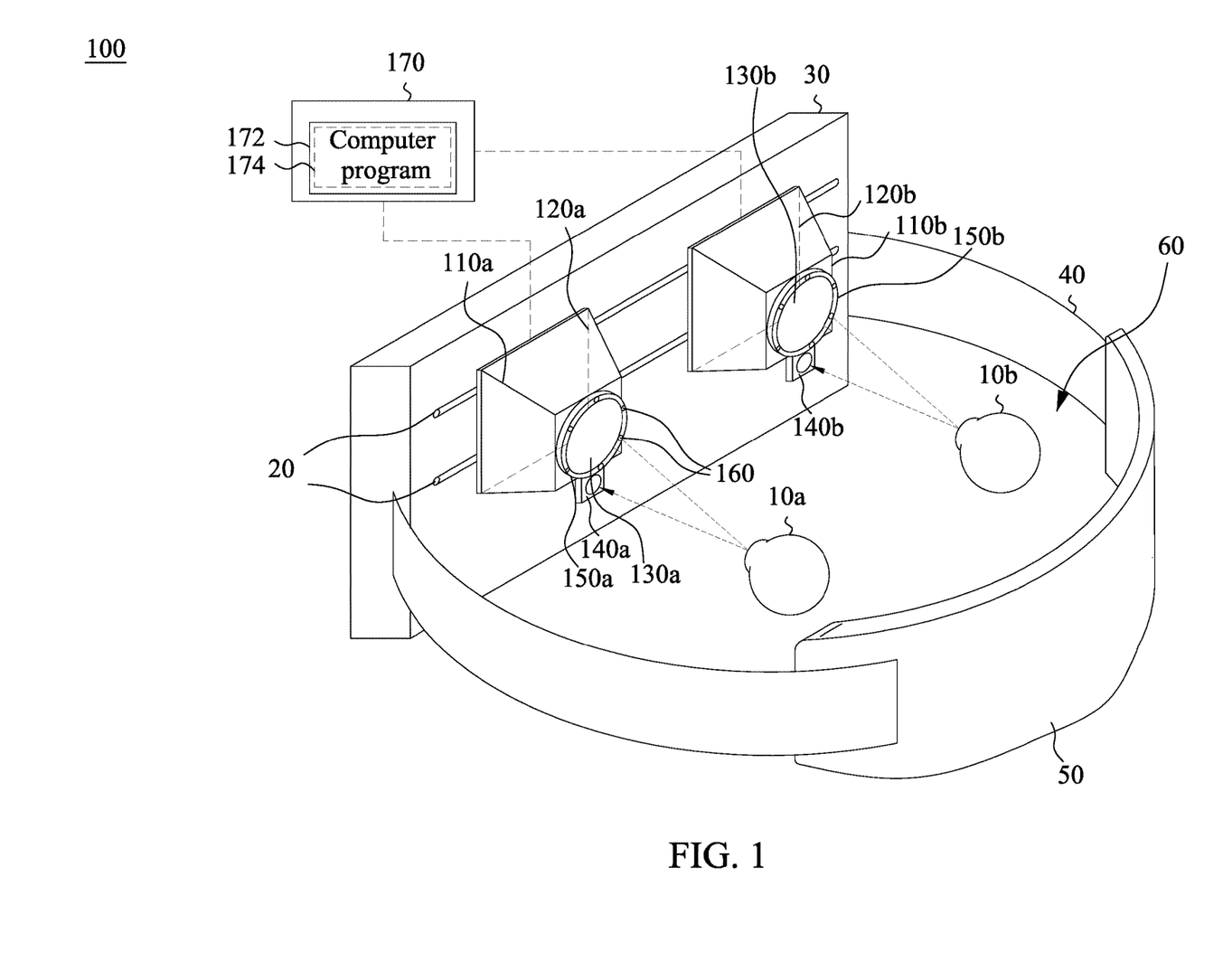
FIG. 1 is a simplified functional block diagram of a head-mounted device (HMD) according to one embodiment of the present disclosure.

FIG. 1 is a simplified functional block diagram of a head-mounted device (HMD) 100 according to one embodiment of the present disclosure. The HMD 100 comprises a first housing 110a, a second housing 110b, a first display 120a, a second display 120b, a first lens 130a, and a second lens 130b. The first housing 110a and the second housing 110b is substantially barrel shaped. The first display 120a and the first lens 130a are disposed on two opposite sides of the first housing 110a so that the first display 120a is separated from the first lens 130a by an appropriate distance. The second display 120b and the second lens 130b are assembled with the second housing 110b in the similar manner. For the sake of brevity, other functional blocks of the HMD 100 are not shown in FIG. 1.

In some embodiments, the HMD is suitable for the virtual reality (VR) system, the augmented reality (AR) system, and/or the mixed reality (MR) system. A user may watch multimedia images, provided by the first display 120a and the second display 120b, through the first lens 130a and the second lens 130b.

The HMD 100 further comprises a first image capture unit 140a, a second image capture unit 140b, a first frame 150a, a second frame 150b, and a plurality of light sources 160. The first frame 150a and the first lens 130a are disposed on the same end of the first housing 110a, and the first frame 150a exposes the first lens 130a. The second frame 150b and the second lens 130b are disposed on the same end of the second housing 110b, and the second frame 150b exposes the second lens 130b. The light sources 160 are disposed on the first frame 150a and the second frame 150b, but this disclosure is not limited thereto. Light emitted by the light sources 160 irradiates the left eye 10a and right eye 10b of the user. The first image capture unit 140a and the second image capture unit 140b are disposed on the first frame 150a and the second frame 150b, respectively, and are configured to capture images related to the eyes 10a and 10b by receiving light reflected by the eyes 10a and 10b. In other words, when the first housing 110a is moved, the first display 120a and the first image capture unit 140a are moved along with the first housing 110a. Similarly, when the second housing 110b is moved, the second display 120b and the second image capture unit 140b are moved along with the second housing 110b.

In practice, the first image capture unit 140a and the second image capture unit 140b may be realized by infrared camera modules. The first frame 150a and the second frame 150b may be realized by retaining rings. The light sources 160 may be realized by light emitting diodes (LED) emitting invisible light that is harmless to the eyes 10a and 10b such as the infrared light.

The HMD device further comprises a processing circuit 170 coupled with the first image capture unit 140a, the second image capture unit 140b, and mechanisms (e.g., stepping motors, not shown in FIG. 1) for moving the first housing 110a and the second housing 110b along the tracks 20. The processing circuit 170 comprises at least one memory module 172 to store a computer program 174. The processing circuit 170 is configured to execute the computer program 174 to calculate an interpupillary distance (IPD) of the user based on eye features in the images captured by the first image capture unit 140a and the second image capture unit 140b. The processing circuit 170 is also configured to adjust, according to the IPD, a distance between the first housing 110a and the second housing 110b (i.e., a distance between the first display 120a and the second display 120b).

In practice, the processing circuit 170 may be realized by one or more general purpose single-chip or multi-chip processors, digital signal processors (DSPs), application specific integrated circuits (ASICs), field programmable gate arrays (FPGAs), other programmable logic devices, or combination thereof. The memory module 172 may be realized by nonvolatile memory, such as single-level or multi-level flash memory.

The HMD 100 further comprises a main body 30, a plurality of headbands 40, and a base 50. The first housing 110a, the second housing 110b, and the tracks 20 are disposed on the main body 30. In some embodiments, the processing circuit 170 is accommodated by or disposed on the main body 30, but this disclosure is not limited thereto. The headbands 40 are coupled between the main body 30 and the base 50 to from an accommodating space 60 for accommodate the head of the user.

Figure 2:
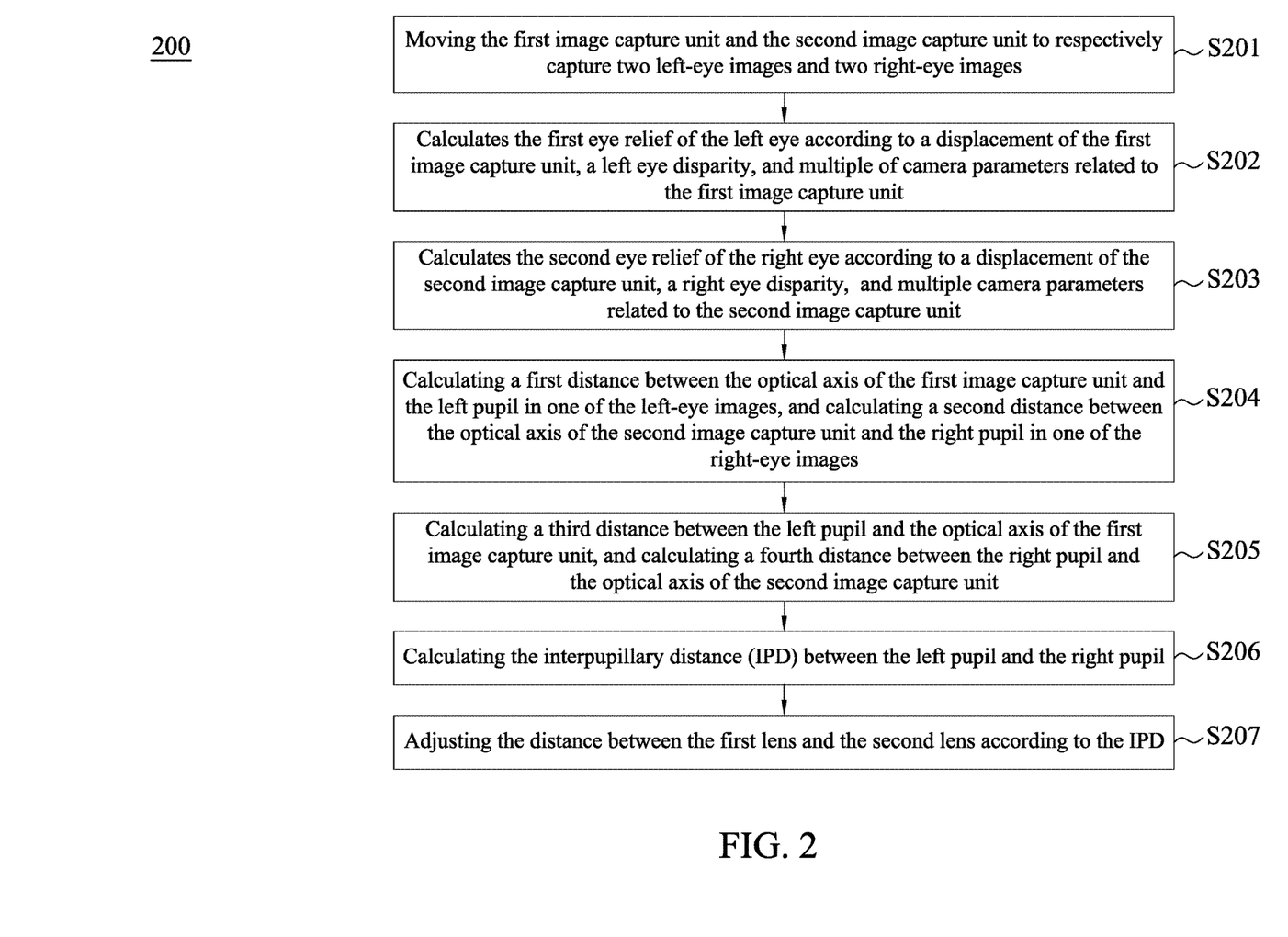
FIG. 2 is a flowchart of a driving method for calculating the IPD according to one embodiment of the present disclosure.

FIG. 2 is a flowchart of a driving method 200 for calculating the IPD according to one embodiment of the present disclosure. The processing circuit 170 may execute the computer program 174 to perform the driving method 200. In operation S201, the HMD 100 moves the first image capture unit 140a, by moving the first housing 110a, to capture two images of the left eye 10a respectively at two different locations. The HMD 100 also moves the second image capture unit 140b, by moving the second housing 110b, to capture two images of the right eye 10b respectively at two different locations.

Figure 3A:
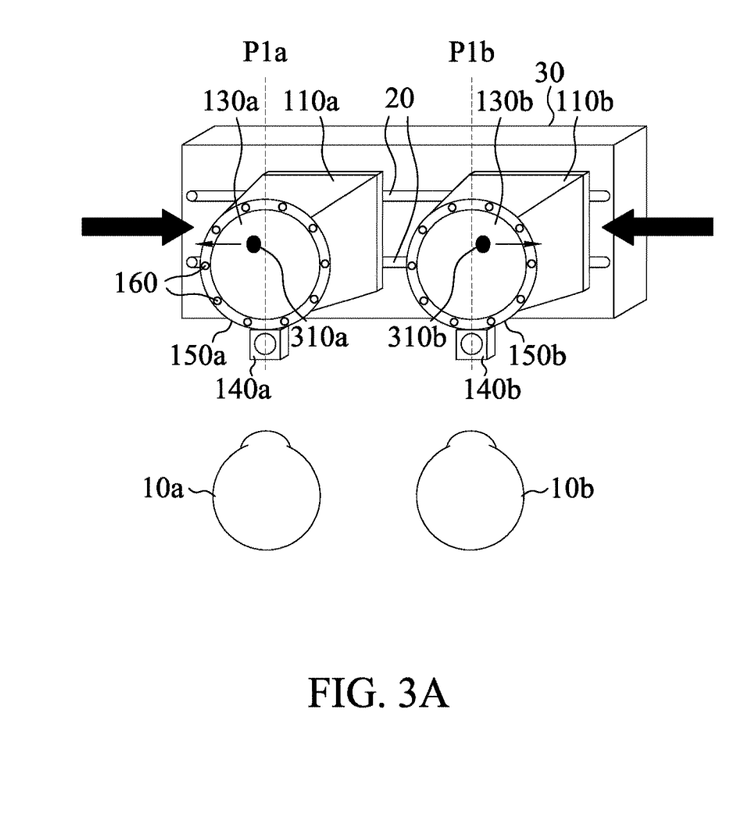
FIG. 3A is a schematic diagrams for illustrating the movement of the image capture units according to one embodiment of the present disclosure.
Figure 3B:
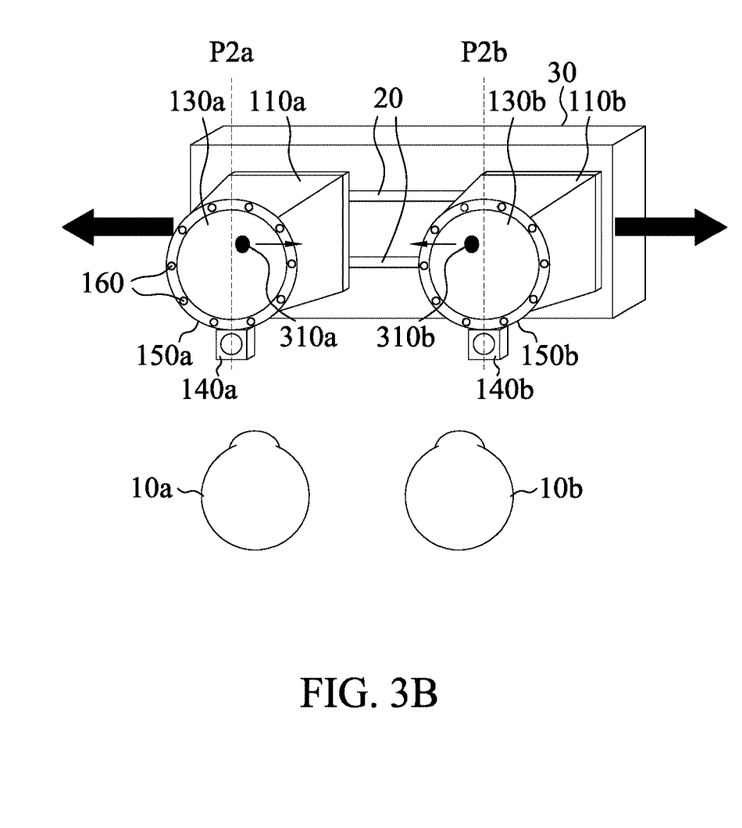
FIG. 3B is another schematic diagrams for illustrating the movement of the image capture units according to one embodiment of the present disclosure.

In this embodiments, as shown in FIGS. 3A and 3B which are schematic diagrams for illustrating the movement of the first image capture unit 140a and the second image capture unit 140b in operation S201, the first image capture unit 140a and the second image capture unit 140b are first moved toward each other to reach the positions P1a and P1b to respectively capture an image of the left eye 10a and an image of the right eye 10b. Then, the first image capture unit 140a and the second image capture unit 140b are moved away from each other to reach the positions P2a and P2b to respectively capture another image of the left eye 10a and another image of the right eye 10b. In other words, the first housing 110a and the second housing 110b are moved toward each other and then away from each other in operation S201.

In some embodiments, to ensure that the user maintains staring substantially straight ahead in operation S201, the first display 120a and the second display 120b may show a first interesting point 310a and a second interesting point 310b, respectively. The first interesting point 310a has a moving direction opposite to that of the first display 120a (i.e., that of the first housing 110a and the first image capture unit 140a). The second interesting point 310b has a moving direction opposite to that of the second display 120b (i.e., that of the second housing 110b and the second image capture unit 140b). As shown in FIG. 3A, for example, when the first display 120a and the second display 120b are moved toward each other, the first interesting point 310a and the second interesting point 310b moves away from to each other. As shown in FIG. 3B, as another example, when the first display 120a and the second display 120b are moved away from each other, the first interesting point 310a and the second interesting point 310b moves toward each other.

In other embodiments, the first image capture unit 140a and the second image capture unit 140b may be first moved away from each other and then toward each other in operation S201. In yet other embodiments, the first image capture unit 140a and the second image capture unit 140b may be only moved toward each other or away from each other in operation S201.

Figure 4:
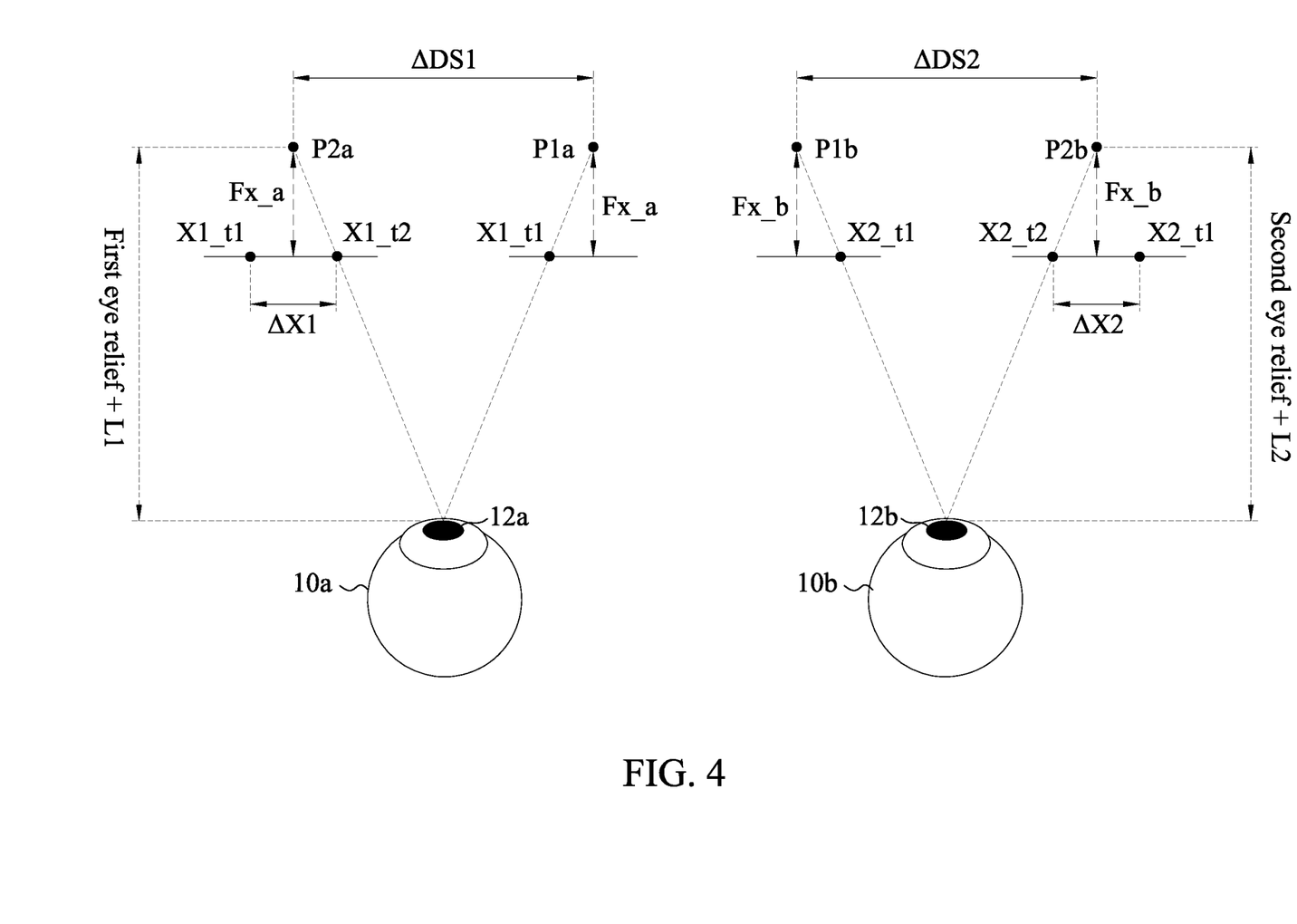
FIG. 4 is a schematic diagram for illustrating the calculation processes of the eye relief according to one embodiment of the present disclosure.

In operation S202, the HMD 100 calculates a first eye relief of the left eye 10a. The term "eye relief" in this disclosure is defined as a distance from the eye of the user to an outer surface (or the center of the outer surface) of a corresponding lens. For example, the first eye relief is a distance from the left eye 10a to the outer surface of the first lens 130a. As another example, the second eye relief is a distance from the right eye 10b to the outer surface of the second lens 130b. As shown in FIG. 4, which is a schematic diagram for illustrating the calculation processes of the first eye relief and the second eye relief, the HMD 100 recognizes the left pupil 12a in the two left-eye images captured at the positions P1a and P2a. In the left-eye image captured at the position P1a, the left pupil 12a has a location corresponding to a coordinate X1_t1. In the left-eye image captured at the position P2a, the left pupil 12a has another location corresponding to a coordinate X1_t2. The HMD 100 calculates a left-eye disparity ΔX1 of the left pupil 12a between the two left-eye images according to the coordinates X1_t1 and X1_t2, that is, the left-eye disparity ΔX1 is the distance between the coordinates X1_t1 and X1_t2. Then, the HMD 100 calculates the first eye relief, as shown in Formula 1, according to the left-eye disparity ΔX1, the focal length Fx_a of the first image capture unit 140a, an equivalent length L1 from a plane (labelled as 510 in FIGS. 5A-5C) on the outer surface of the first lens 130a to the first image capture unit 140a, and the displacement ΔDS1 of the first image capture unit 140a (i.e., the distance between the positions P1a and P2a).

$$\text{first eye relief} = \Delta DS1 \cdot \frac{FX\_a}{\Delta X1} - L1 \qquad \text{(Formula 1)}$$

Figure 5A:
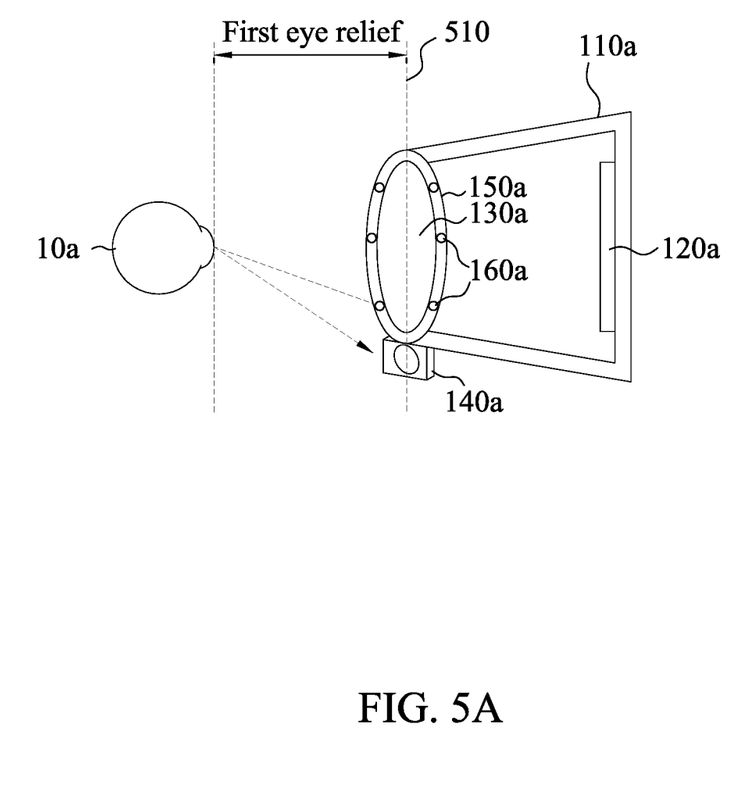
FIG. 5A is a schematic diagram of part of components of the HMD according to one embodiment of the present disclosure.

In this embodiment, as shown in FIG. 5A, the first image capture unit 140a is substantially on the same plane 510 with the outer surface of the first lens 130a. Therefore, the equivalent length L1 may be set to approximately 0.

Figure 5B:
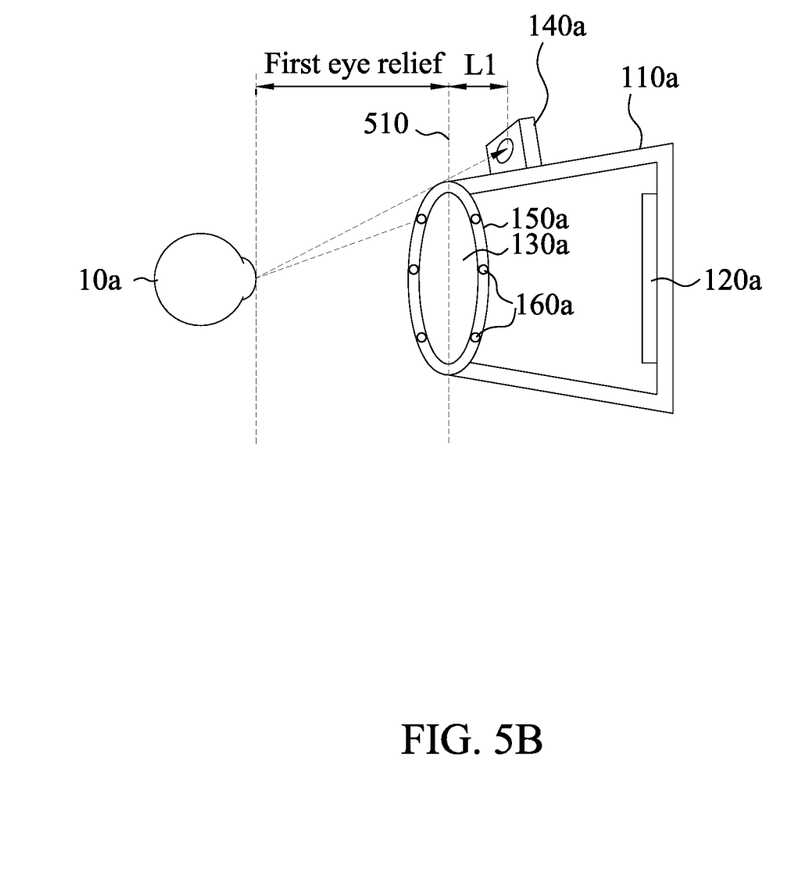
FIG. 5B is a schematic diagram of part of components of the HMD according to another embodiment of the present disclosure.

In another embodiment, the first image capture unit 140a and the second image capture unit 140b may be disposed on the outer surfaces of the first housing 110a and the second housing 110b, respectively, as shown in FIG. 5B. In this case, the equivalent length L1 should not be omitted when calculating the first eye relief.

Figure 5C:
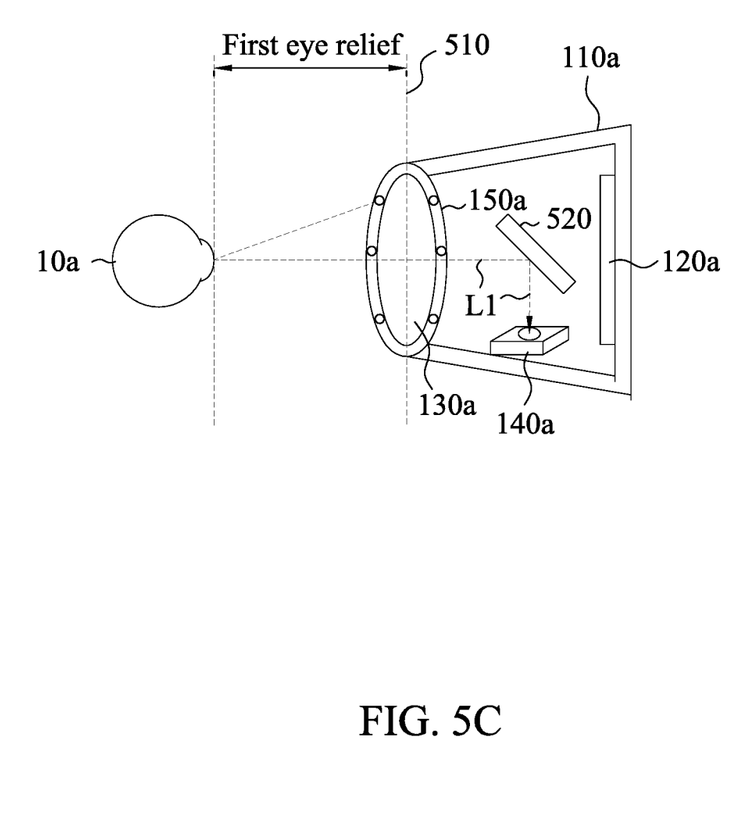
FIG. 5C is a schematic diagram of part of components of the HMD according to yet another embodiment of the present disclosure.

In yet another embodiment, the first image capture unit 140a and the second image capture unit 140b may be disposed on the inner surfaces of the first housing 110a and the second housing 110b, respectively, with hot mirrors 520 as shown in FIG. 5C. The hot mirror 520 reflects infrared light, while allowing visible light to pass. In this situation, when calculating the first eye relief, the equivalent length L1 is from the plane 510 to the hot mirror 520 and to the first image capture unit 140a.

Reference is made to FIGS. 2 and 4, in operation S203, the HMD 100 calculates a second eye relief of the right eye 10b according to a displacement ΔDS2 of the second image capture unit 140b, a right-eye disparity ΔX2, and a plurality of camera parameters related to the second image capture unit 140b. The displacement ΔDS2 of the second image capture unit 140b is the distance between the positions P1b and P2b. The right-eye disparity ΔX2 corresponds to the difference of coordinates X2_t1 and X2_t2 of the right pupil 12b between the two right-eye images. The camera parameters related to the second image capture unit 140b comprise the focal length FX_b of the second image capture unit 140b, and also comprise an equivalent length L2 from a plane on the outer surface of the second lens 130b to the second image capture unit 140b which is similar to the equivalent length L1. That is, the processes for calculating the first eye relief of the left eye 10a are also applicable for calculating the second eye relief of the right eye 10b. For the sake of brevity, those descriptions will not be repeated here.

Figure 6:
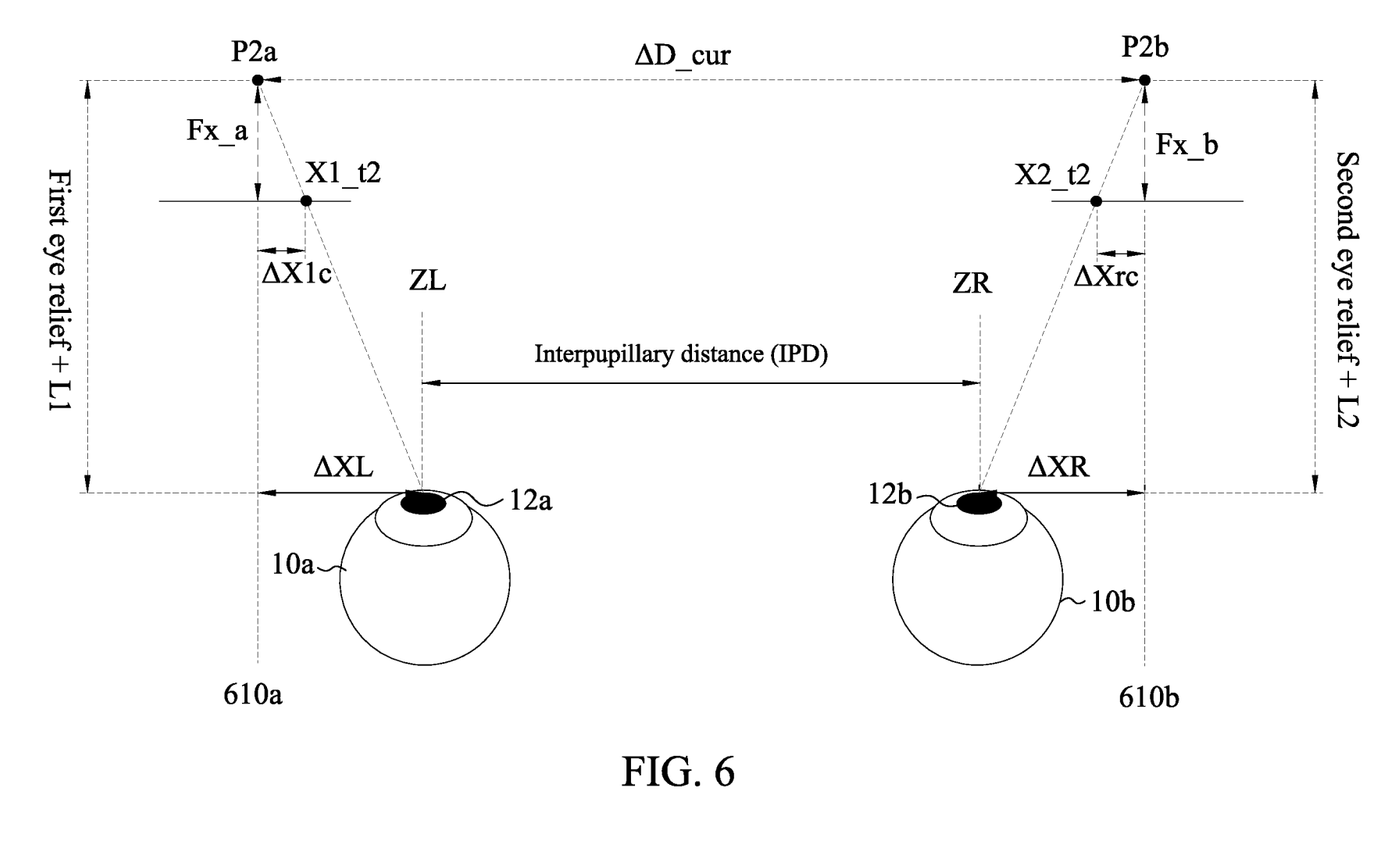
FIG. 6 is a schematic diagram for illustrating the calculation processes of the IPD according to one embodiment of the present disclosure.

Reference is made to FIGS. 2 and 6. FIG. 6 is a schematic diagram for illustrating the calculation processes of the IPD according to one embodiment of the present disclosure. In operation S204, the HMD 100 calculates a first distance ΔXlc between an optical axis 610a of the first image capture unit 140a and the left pupil 12a in a left-eye image (e.g., the left-eye image captured at position P2a). The HMD 100 also calculates a second distance ΔXrc between an optical axis 610b of the second image capture unit 140b and the right pupil 12b in a right-eye image (e.g., the right-eye image captured at position P2b). As shown in FIG. 6, the left pupil 12a in the left-eye image corresponds to the coordinate X1_t2, and the optical axis 610a corresponds to the center (e.g., origin of coordinate) of the left-eye image. Therefore, the first distance ΔXlc is the distance between the coordinate X1_t2 and the origin of the left-eye image. The right pupil 12b in the right-eye image corresponds to the coordinate X2_t2, and the optical axis 610b corresponds to the center (e.g., origin of coordinate) of the right-eye image. Therefore, the second distance ΔXrc is the distance between the coordinate X2_t2 and the origin of the right-eye image.

In operation S205, the HMD 100 calculates a third distance ΔXL between the left pupil 12a and the optical axis 610a of the first image capture unit 140a, and also calculates a fourth distance ΔXR between the right pupil 12b and the optical axis 610b of the second image capture unit 140b. The third distance ΔXL may be calculated according to the first eye relief of the left eye 10a, the first distance ΔXlc, the focal length Fx_a of the first image capture unit 140a, and the equivalent length L1, as shown in Formula 2. The fourth distance ΔXR may be calculated according to the second eye relief of the right eye 10b, the second distance ΔXrc, the focal length Fx_b of the second image capture unit 140b, and the equivalent length L2, as shown in Formula 3.

$$\Delta XL = (\text{first eye relief} + L1) \cdot \frac{\Delta Xlc}{FX\_a} \qquad \text{(Formula 2)}$$

$$\Delta XR = (\text{second eye relief} + L2) \cdot \frac{\Delta Xrc}{FX\_b} \qquad \text{(Formula 3)}$$

In operation S206, the HMD 100 calculates the IPD between the left pupil 12a and the right pupil 12b. The IPD may be calculated according to the third distance ΔXL, the fourth distance ΔXR, and a current distance ΔD_cur between the first image capture unit 140a and the second image capture unit 140b, as shown in Formula 4. Since the locations of the first housing 110a and the second housing 110b are determined by the processing circuit 170 and the installation locations of the first image capture unit 140a and the second image capture unit 140b may be stored in the memory module 172 in advanced, the distance ΔD_cur is a known parameter, that is, the distance between the positions P2a and P2b.

$$\text{IPD} = \Delta D\_cur - \Delta XR - \Delta XL \qquad \text{(Formula 4)}$$

In operation S207, the HMD 100 adjusts the distance between the first housing 110a and the second housing 110b according to (e.g., positively correlated to) the IPD, that is, the distance between the first lens 130a and the second lens 130b are adjusted according to (e.g., positively correlated to) the IPD. In some embodiments, the distance between the center (e.g., the optical axis) of the first lens 130a and the center (e.g., the optical axis) of the second lens 130b are adjusted to be equal to the IPD.

Accordingly, one of the advantages of the driving method 200 is that the quantity of computation is considerably low, thereby rendering high execution speed. Another advantage is that the driving method 200 is suitable for various implementations of the image capture units such as illustrated in FIGS. 5A through 5C.

Figure 7:
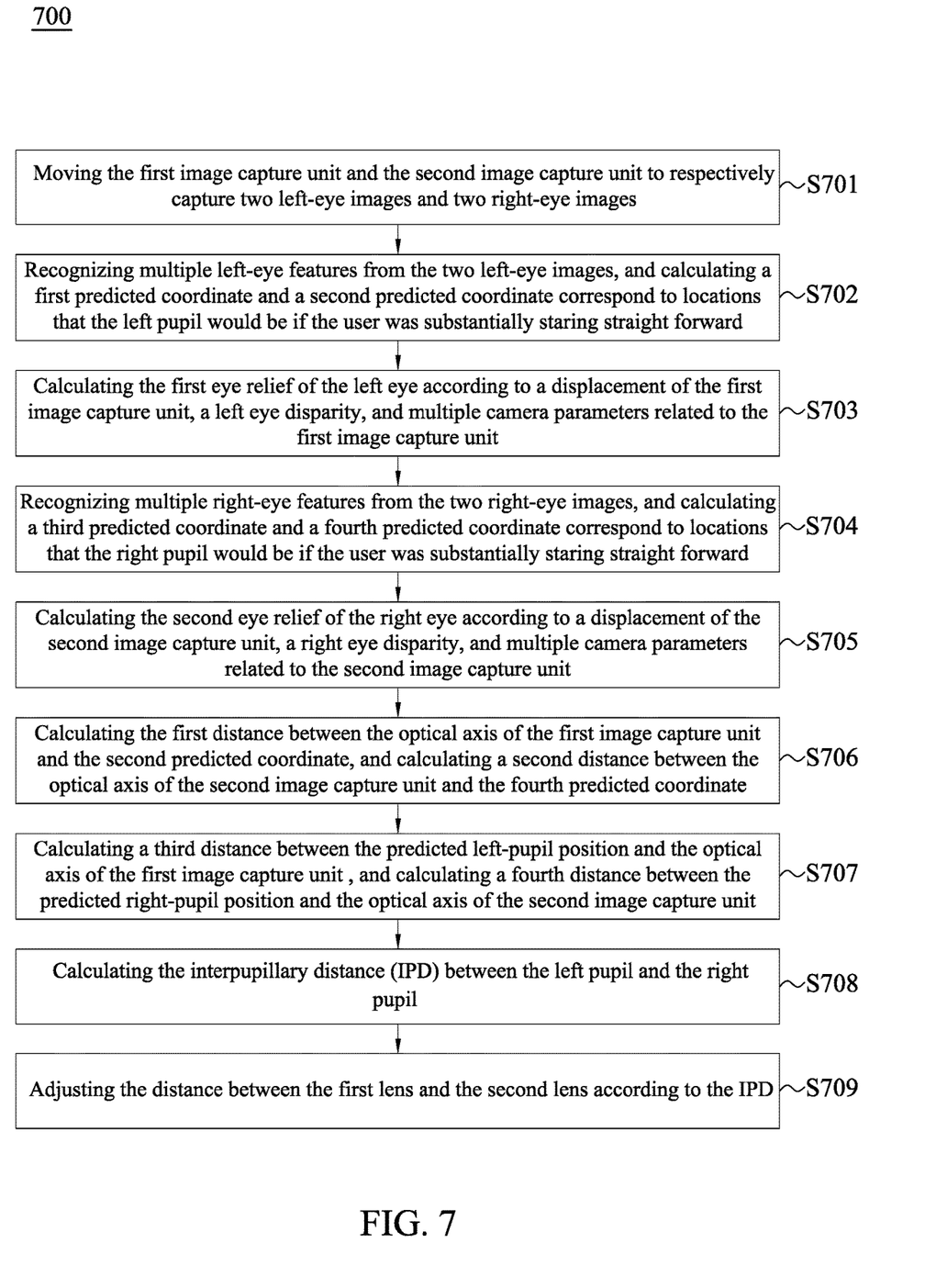
FIG. 7 is a flowchart of a driving method for calculating the IPD according to one embodiment of the present disclosure.
Figure 8:
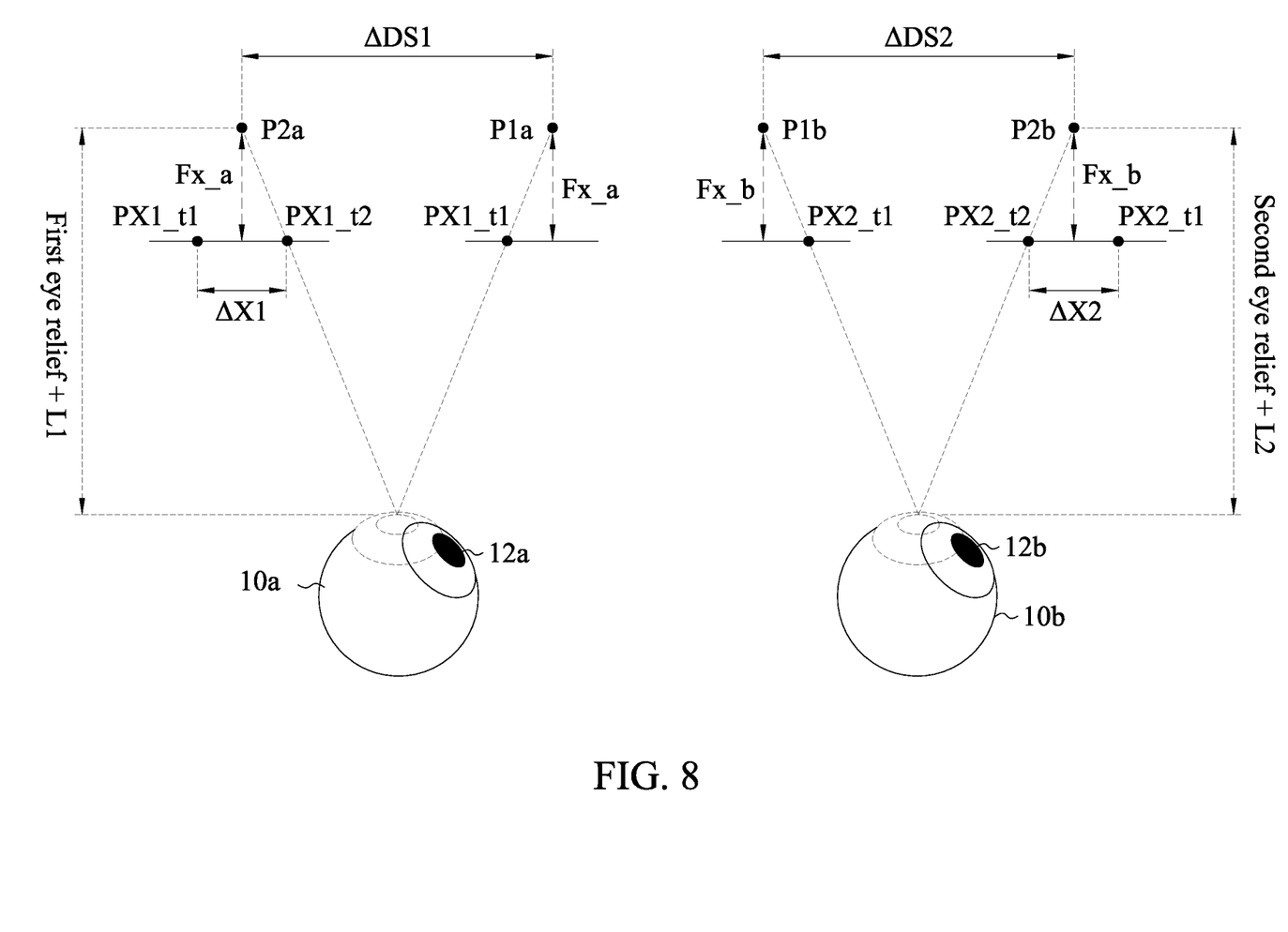
FIG. 8 is a schematic diagram for illustrating the calculation processes of the eye relief according to one embodiment of the present disclosure.
Figure 9:
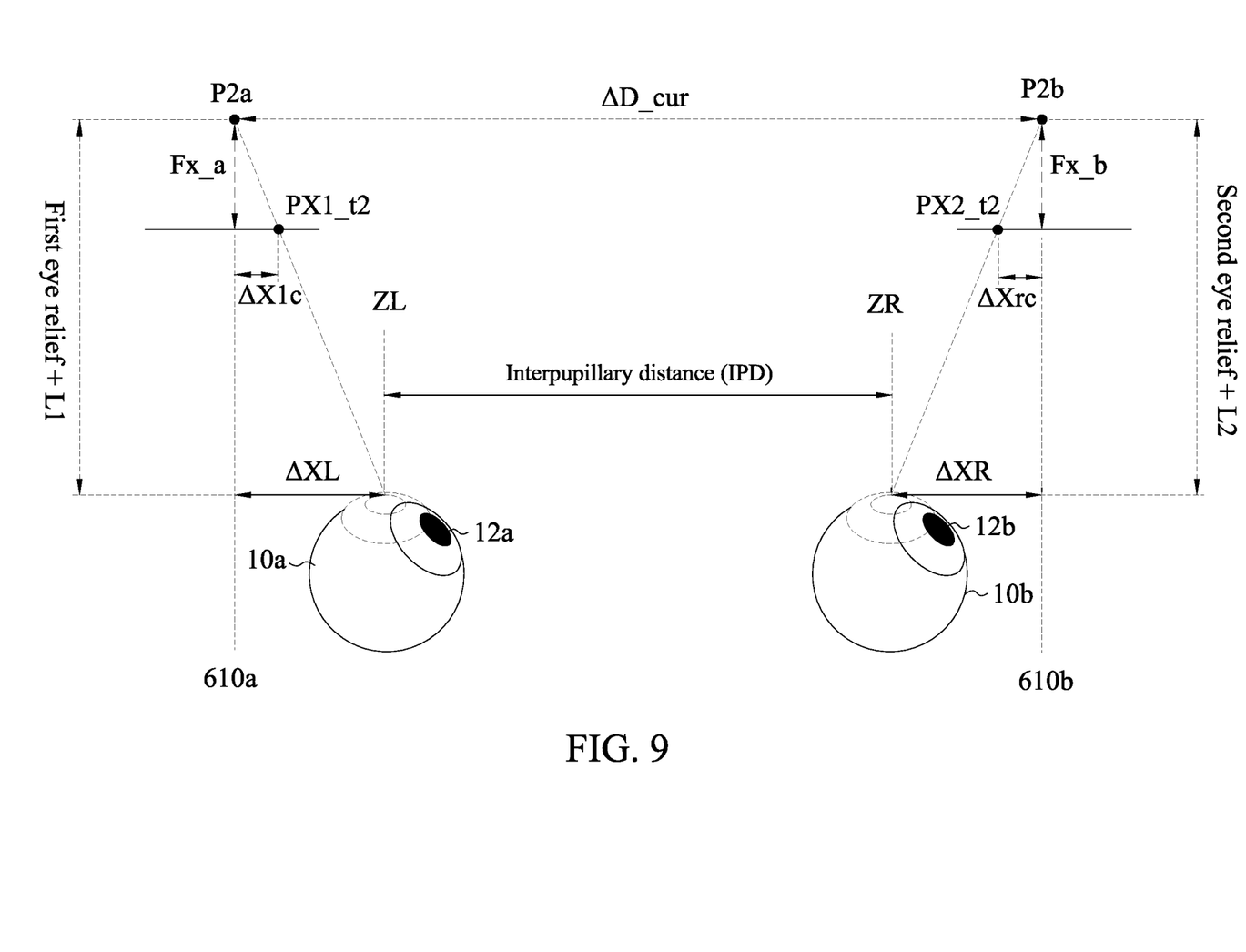
FIG. 9 is a schematic diagram for illustrating the calculation processes of the IPD according to one embodiment of the present disclosure.

FIG. 7 is a flowchart of a driving method 700 for calculating the IPD according to one embodiment of the present disclosure. FIG. 8 is a schematic diagram for illustrating the calculation processes of the eye relief according to one embodiment of the present disclosure. FIG. 9 is a schematic diagram for illustrating the calculation processes of the IPD according to one embodiment of the present disclosure. The processing circuit 170 may execute the computer program 174 to perform the driving method 700 which does not require the user to maintain staring straight ahead while calculating the IPD. Operation S701 is similar to the aforementioned operation S201. For the sake of brevity, those descriptions will not be repeated here.

Reference is made to FIGS. 7 and 8. Following operation S701, the HMD 100 recognizes, in operation S702, a plurality of left-eye features from the two left-eye images captured in operation S701. The plurality of left-eye features comprises, but not limited to, features of the left eyelid, features of the left iris, and/or the left eye pupil 12a. In operation S702, the HMD 100 also calculates a first predicted coordinate PX1_t1 and a second predicted coordinate PX1_t2, as shown in FIG. 8, according to the plurality of left-eye features. The first predicted coordinate PX1_t1 corresponds to a location that the left pupil 12a would be in the left-eye image captured at position P1a if the user was substantially staring straight forward. Similarly, the second predicted coordinate PX1_t2 corresponds to a location that the left pupil 12a would be in the left-eye image captured at position P2a if the user was substantially staring straight forward.

In operation S703, the HMD 100 calculates the left-eye disparity ΔX1 between the first predicted coordinate PX1_t1 and the second predicted coordinate PX1_t2, and then calculates the first eye relief of the left eye 10a according to the left-eye disparity ΔX1, the focal length FX_a of the first image capture unit 140a, the equivalent length L1, and the displacement ΔDS1 of the first image capture unit 140a, which is similar to the calculating processes described in operation S202. For the sake of brevity, those descriptions will not be repeated here.

Operation S704 is similar to operation S702, the difference is that the HMD 100 recognizes a plurality of right-eye features from the two right-eye images captured in operation S701, wherein the plurality of right-eye features comprises, but not limited to, features of the right eyelid, features of the right iris, and/or the right eye pupil 12a. Then, the HMD 100 calculates a third predicted coordinate PX2_t1 and a fourth predicted coordinate PX2_t2 respectively corresponds to the locations that the right pupil 12b would be in the two right-eye images if the user was substantially staring straight forward.

In operation S705, the HMD 100 calculates the right-eye disparity ΔX2 between the third predicted coordinate PX2_t1 and the fourth predicted coordinate PX2_t2. Then, the HMD 100 calculates the second eye relief of the right eye 10b according to the right-eye disparity ΔX2, the focal length FX_b of the second image capture unit 140b, the equivalent length L2, and the displacement ΔDS2 of the second image capture unit 140b, which is similar to the calculating processes described in operation S203. For the sake of brevity, those descriptions will not be repeated here.

Reference is made to FIGS. 7 and 9. In operation S706, the HMD 100 calculates the first distance ΔXlc between the second predicted coordinate PX1_t2 and the optical axis 610a of the first image capture unit 140a, and also calculates the second distance ΔXrc between the fourth predicted coordinate PX2_t2 and the optical axis 610b of the second image capture unit 140b, which is similar to the calculating process described in operation S204. For the sake of brevity, those descriptions will not be repeated here.

In operation S707, the HMD 100 calculates the third distance ΔXL according to the first distance ΔXlc, the first eye relief, the focal length FX_a of the first image capture unit 140a, and the equivalent length L1. The HMD also calculates the fourth distance ΔXR according to the second distance ΔXrc, the second eye relief, the focal length FX_b of the second image capture unit 140b, and the equivalent length L2, wherein the calculation processes of the third distance ΔXL and the fourth distance ΔXR are similar to those described operation S205. For the sake of brevity, those descriptions will not be repeated here. Since the first distance ΔXlc and the second distance ΔXrc are calculated under the circumstances that the user is assumed as staring straight forward, the third distance ΔXL is the difference between a predicted left-pupil position ZL and the optical axis 610a of the first image capture unit 140a and the fourth distance ΔXR is the difference between a predicted right-pupil position ZR and the optical axis 610b of the second image capture unit 140b. That is, the predicted left-pupil position ZL and the predicted right-pupil position ZR respectively correspond to locations that the left pupil 12a and the right pupil 12b would be in the accommodating space 60 if the user was staring straight forward.

Then, the HMD 100 conducts operations S708 and S709, which are respectively similar to operations S206 and S207, to calculate the IPD in operation S708 and then adjust the distance between the first lens 130a and the second lens 130b according to (e.g., positively correlated to) the IPD in operation S709. For the sake of brevity, those descriptions will not be repeated here. In this embodiment, the IPD is the distance between the predicted left-pupil position ZL and the predicted right-pupil position ZR. In some embodiments, the distance between the center (e.g., the optical axis) of the first lens 130a and the center (e.g., the optical axis) of the second lens 130b are adjusted to be equal to the IPD in operation S709.

Accordingly, one of the advantages of the driving method 700 is that the user is not required to maintain staring straight ahead during calculating the IPD.

In some embodiments, the HMD prompts the user in operation S207 of driving method 200 or operation S709 in driving method 700, by predetermined voice, predetermined light pattern, or combination thereof, to manually adjust the distance between the first lens 130a and the second lens 130b according to the IPD.

In some embodiments, after recognizing the plurality of left-eye features and the plurality of right-eye features in operation S702, the HMD 100 may construct a 3-dimensional (3D) left-eye model and a 3D right-eye model both located in a coordinate system of the accommodating space 60 by, for example, using the algorithm of perspective-n-point (PnP). The HMD may further store the coordinates, which is of the coordinate system of the accommodating space 60, of the 3D left-eye model and the 3D right-eye model in the memory module 172. In these embodiments, when the user puts on the HMD 100 thereafter, or when the HMD shifts or rotates due to intense movement of the user, the HMD 100 needs not to recalculate the IPD but can automatically adjust or prompt the user to manually adjust the distance between the first lens 130a and the second lens 130b based on the 3D eye models stored in the memory module 172.

In some embodiments that the IPD has been determined, the HMD 100 may further use the first image capture unit 140a to capture a plurality of left-eye images, and use the second image capture unit 140*b* to capture a plurality of right-eye images. Then, the HMD 100 recognizes the plurality of left-eye features from the plurality of left-eye images and the plurality of right-eye features from the plurality of right-eye images to dynamically determine a point of gaze of the user. The point of gaze is dynamically transmitted to an external graphic processing unit (GPU) for dynamically rendering pictures provided to the first display 120*a* and the second display 120*b* to reduce the chance that the image distortion is observed by the user.

The execution order of the operations in the previous flowcharts 200 or 700 is merely an example, rather than a restriction to practical implementations. For example, in the flowchart 200, operations S202 and S203 may be performed simultaneously or swapped with each other. As another example, in the flowchart 700, operations S702 and S703 may be swapped with operations S704 and S705.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A driving method, suitable for a head mounted device (HMD), comprising:
    moving a first image capture unit and a second image capture unit of the HMD to respectively capture two left-eye images and two right-eye images;
    calculating a first eye relief according to at least one left-eye feature in the two left-eye images;
    calculating a second eye relief according to at least one right-eye feature in the two right-eye images;
    calculating an interpupillary distance (IPD) according to the first eye relief and the second eye relief; and
    adjusting, according to the IPD, a distance between a first lens and a second lens of the HMD.

2. The driving method of claim 1, wherein the operation of calculating the first eye relief comprises:
    calculating a left-eye disparity of the at least one left-eye feature between the two left-eye images; and
    calculating the first eye relief according to a plurality of camera parameters related to the first image capture unit or the second image capture unit, a displacement of the first image capture unit, and the left-eye disparity.

3. The driving method of claim 1, wherein the operation of calculating the IPD comprises:
    calculating a first distance between the at least one left-eye feature and an optical axis of the first image capture unit;
    calculating a second distance between the at least one right-eye feature and an optical axis of the second image capture unit;
    calculating, according to the first eye relief, the first distance, and a plurality of camera parameters related to the first image capture unit or the second image capture unit, a third distance between the left pupil and the optical axis of the first image capture unit;
    calculating, according to the second eye relief, the second distance, and the plurality of camera parameters, a fourth distance between the right pupil and the optical axis of the second image capture unit; and
    calculating the IPD according to the third distance, the fourth distance, and a distance between the first image capture unit and the second image capture unit.

4. The driving method of claim 3, wherein the first display is moved along with the first image capture unit, the second display is moved along with the second image capture unit,
    when the first display is moved in a first direction, the first display shows a first interest point having a moving direction opposite to the first direction,
    when the second display is moved in a second direction, the second display shows a second interest point having a moving direction opposite to the second direction.

5. The driving method of claim 1, wherein the operation of calculating the first eye relief comprises:
    recognizing, from the two left-eye images, a plurality of left-eye features comprising the at least one left-eye feature;
    calculating, according to the plurality of left-eye features, a first predicted coordinate and a second predicted coordinate of the left pupil respectively in the two left-eye images and both corresponding to a situation that a user is substantially staring straight forward;
    calculating a left-eye disparity between the first predicted coordinate and the second predicted coordinate; and
    calculating the first eye relief according to a plurality of camera parameters related to the first image capture unit or the second image capture unit, a displacement of the first image capture unit, and the left-eye disparity.

6. The driving method of claim 5, wherein the operation of calculating the second eye relief comprises:
    recognizing, from the two right-eye images, a plurality of right-eye features comprising the at least one right-eye feature;
    calculating, according to the plurality of right-eye features, a third predicted coordinate and a fourth predicted coordinate of the right pupil respectively in the two right-eye images and both corresponding to the situation that the user is substantially staring straight forward;
    calculating a right-eye disparity between the third predicted coordinate and the fourth predicted coordinate; and
    calculating the second eye relief according to the plurality of camera parameters, a displacement of the second image capture unit, and the right-eye disparity.

7. The driving method of claim 6, wherein the operation of calculating the IPD comprises:
    calculating a first distance between the second predicted coordinate and an optical axis of the first image capture unit;

calculating a second distance between the fourth predicted coordinate and an optical axis of the second image capture unit;

calculating, according to the first eye relief, the first distance, and the plurality of camera parameters, a third distance between the optical axis of the first image capture unit and a predicted left-pupil position in an accommodating space of the HMD;

calculating, according to the second eye relief, the second distance, and the plurality of camera parameters, a fourth distance between the optical axis of the second image capture unit and a predicted right-pupil position in the accommodating space; and calculating the IPD according to the third distance, the fourth distance, and a distance between the first image capture unit and the second image capture unit.

8. The driving method of claim 6, further comprising:

constructing and storing, according to the plurality of left-eye features and the plurality of right-eye features, a 3-dimensional (3D) left-eye model and a 3D right-eye model located in an accommodating space of the HMD; and automatically adjust or prompting the user to manually adjust, according to the 3D left-eye model and the 3D right-eye model, the distance between the first lens and the second lens.

9. The driving method of claim 6, wherein the driving method further comprises:

utilizing the first image capture unit to capture a plurality of left-eye images;

utilizing the second image capture unit to capture a plurality of right-eye images; and recognizing the plurality of left-eye features from the plurality of left-eye images and recognizing the plurality of right-eye features from the plurality of right-eye images to determine a point of gaze of the user, wherein the point of gaze is configured to be used in rendering pictures provided to the first display and the second display.

10. The driving method of claim 1, wherein when adjusts the distance between the first lens and the second lens, automatically adjusts or prompts the user to manually adjust the distance between a center of the first lens and a center of the second lens to be equal to the IPD.

11. A head-mounted device (HMD), comprising:

a first lens;

a second lens;

a first image capture unit, disposed at a first housing with the first lens;

a second image capture unit, disposed at a second housing with the second lens; and a processing circuit, being adapted to:

move the first image capture unit and the second image capture unit to respectively capture two left-eye images and two right-eye images;

calculate, according to at least one left-eye feature in the two left-eye images, a first eye relief between the first image capture unit and a left pupil;

calculate, according to at least one right-eye feature in the two right-eye images, a second eye relief between the second image capture unit and a right pupil;

calculate an interpupillary distance (IPD) according to the first eye relief and the second eye relief; and automatically adjust or prompt the user to manually adjust, according to the IPD, a distance between the first lens and the second lens.

12. The HMD of claim 11, wherein when calculating the first eye relief, the processing circuit is further adapted to:

calculate a left-eye disparity of the at least one left-eye feature between the two left-eye images; and calculate the first eye relief according to a plurality of camera parameters related to the first image capture unit or the second image capture unit, a displacement of the first image capture unit, and the left-eye disparity.

13. The HMD of claim 11, wherein when calculating the IPD, the processing circuit is further adapted to:

calculate a first distance between the at least one left-eye feature and an optical axis of the first image capture unit;

calculate a second distance between the at least one right-eye feature and an optical axis of the second image capture unit;

calculate, according to the first eye relief, the first distance, and a plurality of camera parameters related to the first image capture unit or the second image capture unit, a third distance between the left pupil and the optical axis of the first image capture unit;

calculate, according to the second eye relief, the second distance, and the plurality of camera parameters, a fourth distance between the right pupil and the optical axis of the second image capture unit; and calculate the IPD according to the third distance, the fourth distance, and a distance between the first image capture unit and the second image capture unit.

14. The HMD of claim 13, further comprising:

a first display, disposed at the first housing; and a second display, disposed at the second housing, wherein the first display is moved along with the first image capture unit, the second display is moved along with the second image capture unit, when the first display is moved in a first direction, the first display shows a first interest point having a moving direction opposite to the first direction, when the second display is moved in a second direction, the second display shows a second interest point having a moving direction opposite to the second direction.

15. The HMD of claim 11, wherein when calculating the first eye relief, the processing circuit is further adapted to:

recognize, from the two left-eye images, a plurality of left-eye features comprising the at least one left-eye feature;

calculate, according to the plurality of left-eye features, a first predicted coordinate and a second predicted coordinate of the left pupil respectively in the two left-eye images and both corresponding to a situation that a user is substantially staring straight forward;

calculate a left-eye disparity between the first predicted coordinate and the second predicted coordinate; and calculate the first eye relief according to a plurality of camera parameters related to the first image capture unit or the second image capture unit, a displacement of the first image capture unit, and the left-eye disparity.

16. The HMD of claim 15, wherein when calculating the second eye relief, the processing circuit is further adapted to:

recognize, from the two right-eye images, a plurality of right-eye features comprising the at least one right-eye feature;

calculate, according to the plurality of right-eye features, a third predicted coordinate and a fourth predicted coordinate of the right pupil respectively in the two right-eye images and both corresponding to the situation that the user is substantially staring straight forward;

calculate a right-eye disparity between the third predicted coordinate and the fourth predicted coordinate; and calculate the second eye relief according to the plurality of camera parameters, a displacement of the second image capture unit, and the right-eye disparity.

17. The HMD of claim 16, wherein when calculating the IPD, the processing circuit is further adapted to:

calculate a first distance between the second predicted coordinate and an optical axis of the first image capture unit;

calculate a second distance between the fourth predicted coordinate and an optical axis of the second image capture unit;

calculate, according to the first eye relief, the first distance, and the plurality of camera parameters, a third distance between the optical axis of the first image capture unit and a predicted left-pupil position in an accommodating space of the HMD;

calculate, according to the second eye relief, the second distance, and the plurality of camera parameters, a fourth distance between the optical axis of the second image capture unit and a predicted right-pupil position in the accommodating space; and calculate the IPD according to the third distance, the fourth distance, and a distance between the first image capture unit and the second image capture unit.

18. The HMD of claim 16, wherein the processing circuit is further adapted to:

construct and store, according to the plurality of left-eye features and the plurality of right-eye features, a 3D left-eye model and a 3D right-eye model located in an accommodating space of the HMD; and automatically adjust or prompt the user to manually adjust, according to the 3D left-eye model and the 3D right-eye model, the distance between the first lens and the second lens.

19. The HMD of claim 16, the processing circuit is further adapted to:

instruct the first image capture unit to capture a plurality of left-eye images;

instruct the second image capture unit to capture a plurality of right-eye images; and recognize the plurality of left-eye features from the plurality of left-eye images and recognize the plurality of right-eye features from the plurality of right-eye images to determine a point of gaze of the user, wherein the point of gaze is configured to be used in rendering pictures provided to the first display and the second display.

20. The HMD of claim 11, wherein the distance between a center of the first lens and a center of the second lens is adjusted to be equal to the IPD.

* * * * *